United States Patent [19]

Ager

[11] 4,380,665
[45] Apr. 19, 1983

[54] METHYL ISOCYANATE EMISSION CONTROL

[75] Inventor: John W. Ager, Princeton, N.J.

[73] Assignee: FMC Corporation, Philadelphia, Pa.

[21] Appl. No.: 299,892

[22] Filed: Sep. 8, 1981

[51] Int. Cl.$^3$ .......................................... C07C 127/15
[52] U.S. Cl. ...................................................... 564/61
[58] Field of Search ..................................... 564/61, 58

[56] References Cited

PUBLICATIONS

Gerhardt, CA 69: 35357y (1969).
Wayner & Zook, *Synthetic Organic Chemistry*, Wiley & Sons, Inc., pp. 645 and 678 (1953).

*Primary Examiner*—Thomas A. Waltz
*Attorney, Agent, or Firm*—Robert L. Andersen; H. Robinson Ertelt

[57] ABSTRACT

A method is disclosed for removing methyl isocyanate from gaseous effluent streams by contacting the gaseous effluent stream with activated alumina.

2 Claims, No Drawings

METHYL ISOCYANATE EMISSION CONTROL

The present invention relates to a process for control of methyl isocyanate emissions for chemical plants. More particularly the invention pertains to a process by which methyl isocyanate is removed from the emission by contact with alumina.

Alumina and in particular activated alumina has been used as an adsorbent for gaseous and liquid molecules, as a dessicant, and in various applications as a catalyst.

Methyl isocyanate is used in many chemical applications, including for carbamoylation reactions in the preparation of carbamate insecticides. In plants where methyl isocyanate is employed, methyl isocyanate content of the exhaust gases must be reduced to low levels before the exhaust gases can be vented to the atmosphere. The most common method for removing methyl isocyanate has been to incinerate the gaseous emissions from the plant to burn off and decompose the methyl isocyanate contained in such gases. The incinerators used for this purpose are fueled by various fossil fuels. As the price of fossil fuels has increased it has become increasingly uneconomical to remove methyl isocyanate by that method. More economical means for reducing methyl isocyanate emissions have been sought.

It has now been found that contacting a gaseous effluent stream containing methyl isocyanate with alumina is an extremely efficient and inexpensive method for reducing the methyl isocyanate content of the gaseous effluent to undetectable levels.

Accordingly the invention comprises a process for removing methyl isocyanate from a gaseous effluent stream containing it by contacting the gaseous effluent stream with alumina for a period sufficient to hydrolyze the methyl isocyanate to 1,3-dimethylurea.

In accordance with the preferred embodiment of this invention the gaseous effluent containing methyl isocyanate is passed through a bed or column of alumina, preferably activated alumina, for a period sufficient to allow hydrolysis to occur.

Upon contact with the alumina the methyl isocyanate contained in the effluent stream is hydrolyzed primarily to 1,3-dimethylurea. The 1,3-dimethylurea is deposited on and retained by the alumina and/or vaporized. In order to maintain the efficiency of methyl isocyanate removal, it may be necessary to periodically remove 1,3-dimethylurea deposited on the alumina and to thus regenerate the alumina. This is most readily accomplished by washing the alumina with water then drying, but other methods will be apparent to those skilled in the art.

The removal of methyl isocyanate in accordance with the present invention is influenced by a number of interrelated factors including (1) particle size of the alumina, (2) volume of alumina, (3) humidity, (4) methyl isocyanate levels, (5) time since regeneration of alumina and (6) desired feed pressures, i.e. the force required to feed or pull the exhaust gases through the alumina. The interrelationship of these factors is explained below and when understood will enable one skilled in the art to practice the invention in any given situation.

The particle size of the alumina will directly influence the residence time and pressure necessary for adequate removal of methyl isocyanate.

Alumina is available in numerous particle sizes ranging from ½ inch (1.27 cm) down to fine powders retained on a 325 mesh standard sieve. If it is desired to utilize low feed pressure a larger particle size alumina is generally employed and residence time is increased. If smaller particle size alumina is employed, the necessary residence time decreases, but it is necessary to increase pressure in order to drive the effluent stream through the bed or column of alumina. It has been found that alumina ranging in size from ½ inch down to particles retained on a 200 mesh standard sieve may suitably be employed in a low feed pressure system. A particle size in the range of ½ inch down to those retained on an 8 mesh standard sieve is particularly suitable. It is thus apparent that the selection of particle size for use in the invention is largely a matter of choice based on the available equipment and desired operating conditions.

In order for methyl isocyanate removal to proceed efficiently it is also necessary that some water vapor be present in the gaseous effluent. Usually normal atmospheric humidity is sufficient to assure adequate moisture. However in extremely cold climates when atmospheric humidity declines substantially it may be necessary to add additional water vapor to the effluent stream, particularly where a high level of methyl isocyanate is present in the emission gases. In general it is usually adequate if the gaseous stream contains 2 to 10 parts water per part methyl isocyanate, but a higher moisture content may be employed if desired. If additional moisture is required, this may be achieved by any number of known methods including spraying water vapor into the effluent stream or passing the stream through water prior to contacting the bed or column of alumina.

Depending on alumina volume and particle size and on the amount of methyl isocyanate present in the effluent stream a required residence time, the time the effluent is in contact with the alumina, is generally quite short. In a low pressure system using ½ to 8 mesh alumina residence time may be in the range 0.5 to about 30 seconds, but longer times may be employed if desired. Shorter residence times may also be employed, particularly when the alumina is fresh or freshly regenerated, methyl isocyanate concentrations are low, smaller particles of alumina are employed, or any combination of these factors are present.

The following examples illustrate application of this invention using alumina of several particle sizes and effluent having several concentrations of methyl isocyanate.

EXAMPLE 1

Removal of Methyl Isocyanate From an Air Stream Using 80–200 Mesh Alumina

An air stream containing approximately 6,000 ppm methyl isocyanate was passed at a rate of 450 ml/minute through a ¾ inch by 10 inch column containing 9 g of 80–200 mesh activated alumina. The column effluent was analyzed by gas chromatography and found to contain less than 1 ppm methyl isocyanate. After several hours of operation at room temperature the effluent contained approximately 5 ppm methyl isocyanate. The aluminum bed was then washed with methylene chloride. The organic wash contained only 1,3-dimethylurea.

EXAMPLE 2

Removal of Methyl Isocyanate From an Air Stream Using 28-48 Mesh Alumina

During a 29 hour period an air stream containing approximately 3600 ppm methyl isocyanate was passed through a ¾ by 10 inch column containing 12 g of 28-48 mesh activated alumina. The air stream was prepared by bubbling air at a rate of 10 ml/min. through chilled liquid methyl isocyanate and was then mixed with fresh air flowing at a rate of 450 ml/min. At times the fresh air portion was bubbled through distilled water to increase the water vapor content before mixing. The resulting air stream was analyzed by gas chromatography before entering and after passing through the column. After a column residence time of approximately 1 second, methyl isocyanate was undetectable in the column effluent. When methyl isocyanate was detected in the column effluent, the water vapor content of the fresh air was increased until methyl isocyanate levels were again undetectable. After a total of 29 hours the column was regenerated by washing the alumina with 50 ml of distilled water and drying at 50° C. under reduced pressure. The column was again placed in operation. This process was repeated six times. The aluminum was regenerated once by heating at 260° while passing a stream of dry air through for several hours. Otherwise the column was regenerated by washing with 50 ml to 150 ml distilled water then drying at a temperature of 20°-200° C. under reduced pressure.

EXAMPLE 3

Removal of Methyl Isocyanate From Plant Emissions Using ½" to ¼" Activated Alumina In a pilot plant study, 115 lbs. activated alumina was packed in a 3'×10" stainless steel column. Plant emissions containing 30-90 ppm methyl isocyanate were passed through the alumina at the rate of 50 cubic feet per minute. The column effluent contained undetectable amounts of methyl isocyanate when analyzed by gas chromatography.

I claim:

1. A process for removing methyl isocyanate from a gaseous effluent stream comprising contacting the gaseous effluent stream with alumina for a period sufficient to hydrolyze the methyl isocyanate to 1,3-dimethylurea.

2. The process of claim 1 in which said gaseous effluent stream is passed through a bed or column of alumina having a particle size in the range of ½" to 8 mesh.

* * * * *

UNITED STATES PATENT AND TRADEMARK OFFICE
CERTIFICATE OF CORRECTION

PATENT NO. : 4,380,665
DATED : April 19, 1983
INVENTOR(S) : John W. Ager

It is certified that error appears in the above—identified patent and that said Letters Patent is hereby corrected as shown below:

```
Column 1, line 30, "for" should read --of--.
Column 2, line 15, "the" should be deleted.
Column 4, line 21, "1,3-dimethylurea." should read --
1,3-dimethylurea, in the presence of at least 2 parts by
weight water vapor per part by weight methyl isocyanate.--
```

Signed and Sealed this

Thirtieth Day of July 1985

[SEAL]

Attest:

DONALD J. QUIGG

Attesting Officer

Acting Commissioner of Patents and Trademarks